United States Patent
Lin et al.

(10) Patent No.: US 10,215,439 B2
(45) Date of Patent: Feb. 26, 2019

(54) ROTATABLE AIR FLOW GUIDES FOR COOLING INFORMATION HANDLING SYSTEM COMPONENTS

(71) Applicant: Dell Products L.P., Round Rock, TX (US)

(72) Inventors: Chun-Cheng Lin, Taipei (TW); Yenlin Wang, Taipei (TW); Chih Min Su, New Taipei (TW); Chun Chin Wen, New Taipei (TW); Hsiang Jung Chin, Taoyuan (TW)

(73) Assignee: Dell Products L.P., Round Rock, TX (US)

(*) Notice: Subject to any disclaimer, the term of this patent is extended or adjusted under 35 U.S.C. 154(b) by 97 days.

(21) Appl. No.: 15/619,433

(22) Filed: Jun. 9, 2017

(65) Prior Publication Data

US 2018/0356112 A1 Dec. 13, 2018

(51) Int. Cl.
 *F24F 11/77* (2018.01)
 *G06F 1/20* (2006.01)
 *G05B 15/02* (2006.01)

(52) U.S. Cl.
 CPC .............. *F24F 11/77* (2018.01); *G05B 15/02* (2013.01); *G06F 1/206* (2013.01)

(58) Field of Classification Search
 None
 See application file for complete search history.

(56) References Cited

U.S. PATENT DOCUMENTS

| | | | | |
|---|---|---|---|---|
| 6,427,454 B1* | 8/2002 | West | ..................... | F24F 3/153 62/93 |
| 2007/0037507 A1* | 2/2007 | Liu | .......................... | F24F 11/77 454/229 |
| 2013/0242504 A1* | 9/2013 | Cartes | ................ | G05D 23/1931 361/679.49 |
| 2016/0095258 A1* | 3/2016 | Campbell | .......... | H05K 7/20727 165/138 |
| 2016/0174413 A1* | 6/2016 | Steinbrecher | ...... | H05K 7/20727 361/679.51 |
| 2017/0295673 A1* | 10/2017 | Anderl | ............... | H05K 7/20727 |

* cited by examiner

*Primary Examiner* — Mohammad Ali
*Assistant Examiner* — Bernard G Lindsay
(74) *Attorney, Agent, or Firm* — Jackson Walker L.L.P.

(57) ABSTRACT

An information handling system includes first processing resources, e.g., GPGPU expansion cards, in a first thermal region of the system and second processing resources, e.g., one or more CPUs, in a second thermal region. The system may be configured to perform operations including determining a loading profile of the system. The loading profile indicates power consumption information for each of the thermal regions. One or more thermal fans may be configured in accordance with a fan configuration associated with the loading profile. The fan configuration defines a fan speed and airflow direction for one or more thermal fans and determines, in accordance with the fan speed and airflow direction of each thermal fan, a rotational angle of one or more rotatable airflow guides. The rotational angle of a rotatable airflow guide influences thermal fan airflow provided to one or more of the thermal regions.

18 Claims, 8 Drawing Sheets

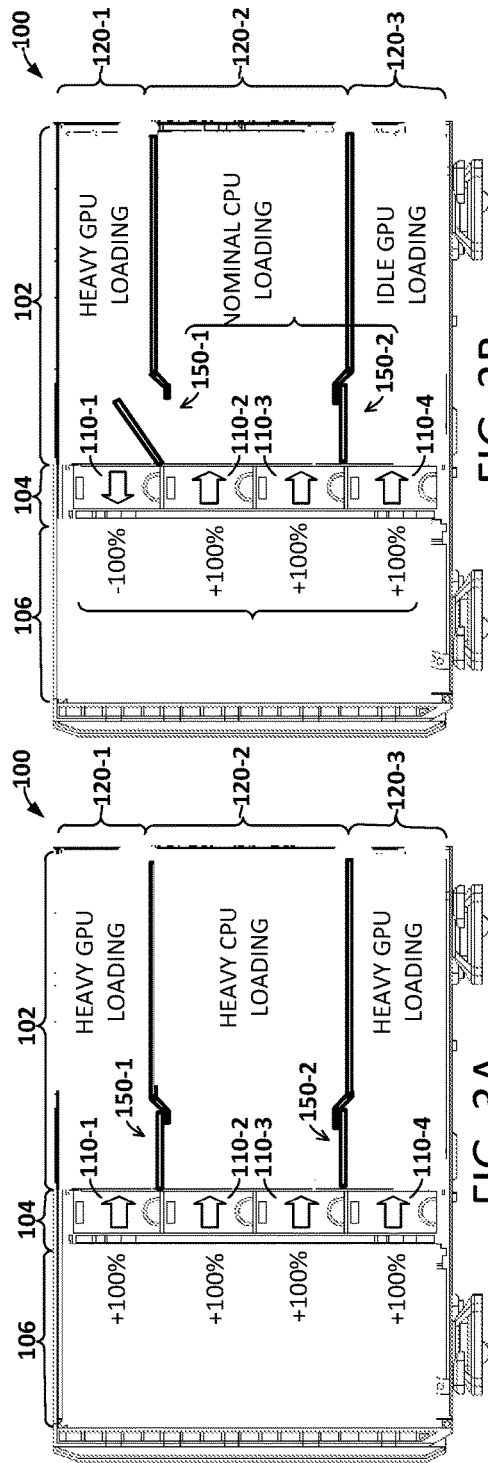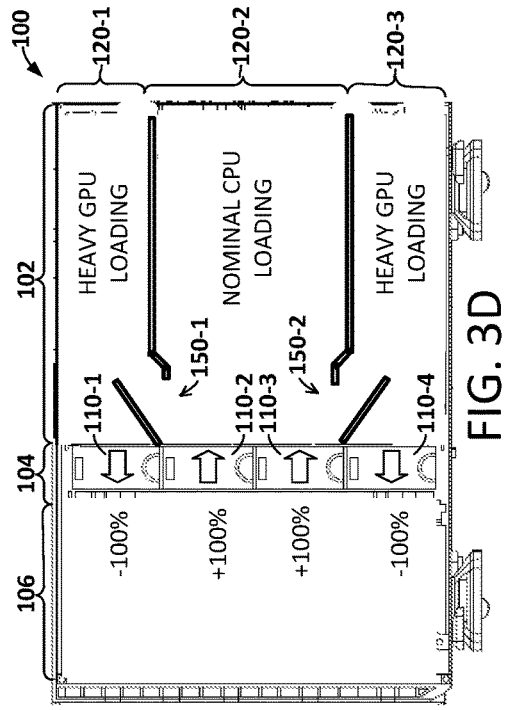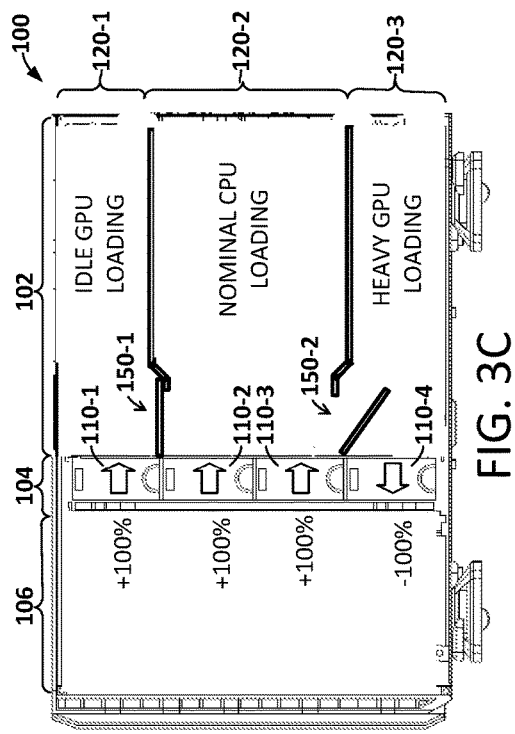

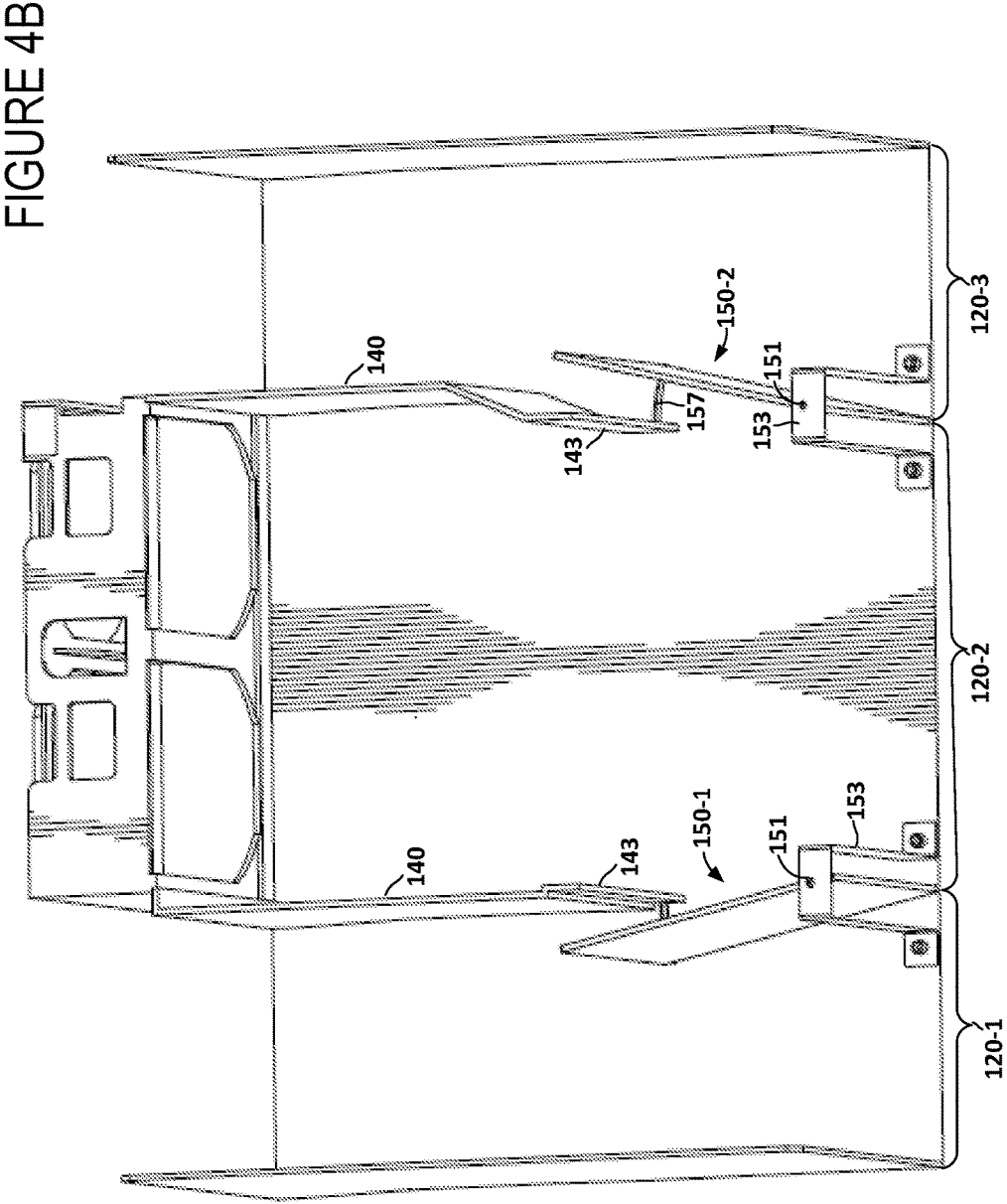

ROTATABLE AIR FLOW GUIDES FOR COOLING INFORMATION HANDLING SYSTEM COMPONENTS

TECHNICAL FIELD

The present disclosure generally relates to thermal management of information handling systems and, more particularly, information handling systems exhibiting localized, non-uniform heat generation.

BACKGROUND

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling system's may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, an information handling system may include a variety of hardware and software components that may be configured to process, store, and communicate information and may include one or more computer systems, data storage systems, and networking systems.

The heat generated by information handling system components during operation must be managed to prevent the information handling system from exceeding applicable thermal specifications and becoming potentially unstable and/or temporarily or permanently non-functional. Information handling systems include thermal fans to dissipate heat generated during operation.

Information handling systems may generate heat non-uniformly. For example, one region of an information handling system may generate more heat than another region. In addition, the non-uniform thermal profile may itself vary depending on the system's operational load. Conventionally configured thermal fans for an information handling system are generally fixed in number, position, and orientation, thus limiting their ability to adapt to accommodate a non-uniform and load-dependent thermal profile.

SUMMARY

Disclosed subject matter improves/addresses issues arising from the limited ability of conventionally-configured thermal fans to accommodate a system that exhibits a non-uniform and load-dependent thermal profile.

Improved heat dissipation is achieved in at least some embodiments using at least one rotating partition element, referred to herein as a rotatable airflow guide, to guide, under particular conditions, thermal fan airflow away from one or more cooler regions towards one or more warmer regions. Each rotatable airflow guide may include a rectangular panel configured to rotate around a pin or other axial element, which may be located at a first end of the panel.

Rotatable airflow guides may be positioned in relation to two or more thermal fans such that the airflow produced by the applicable thermal fans creates a pressure differential that applies a rotational force to the rotatable airflow guide and thereby determines the rotational angle of the rotatable airflow guide. A rotatable airflow guide may include retention structures that constrain the range of rotational angles the rotatable airflow guide is permitted to occupy. In at least some of these embodiments, the retention structures constrain the rotatable airflow guide to occupy one of a finite set of discrete rotational angles. For example, in at least one embodiment, each rotatable airflow guide is configured to occupy either one of two rotational angles, a closed rotational angle and an open rotational angle. In at least one such embodiment, the closed rotational angle may be approximately 0 degrees and the open rotational angle may be anywhere within a range of approximately 15 degrees to approximately 60 degrees although other embodiments may employ larger or smaller open angles.

Suitable configurations of the system's rotatable airflow guides may be determined for various operational profiles. An operational profile may refer to a thermal profile indicative of temperature information, a loading profile indicative of power consumption information, or any other type of profile indicative of an attribute that correlates with or is predictive of temperature. Although temperature is the parameter to be controlled in heat dissipation applications, other parameters, which may be easier, faster, and/or less expense to monitor, may serve as a suitable proxy for temperature. Embodiments described herein may monitor loading, which may be indicated by electrical parameters such as current, voltage, and/or electrical power consumption, as a proxy for temperature and/or heat generation. Descriptions of embodiments that monitor a thermal profile proxy do not preclude embodiments that employ thermal profiles directly.

Generally, a rotatable airflow guide positioned between two thermal regions should occupy a closed rotational angle, in which diversion or re-direction of airflow from the two thermal fans is low, for loading profiles in which the power consumption of the two adjacent thermal regions is roughly equivalent. During loading profiles in which the power consumption within a first of the two thermal regions significantly exceeds the power consumption in the other thermal region, the rotatable airflow guide should occupy an open rotational angle, wherein at least some thermal fan airflow is diverted from the low-loading region to the high-loading region.

Once a particular rotatable airflow guide configuration (RAG configuration) is associated with a particular loading profile, a fan configuration capable of achieving the particular RAG configuration may be assigned to the loading profile. Fan configurations may include information indicative of the fan speed and direction for each of the one or more thermal fans.

A system may be characterized to determine its most commonly occurring loading profiles. Each of the most common loading profiles may then be associated with a RAG configuration and a corresponding fan configuration wherein the fan configuration, when implemented, produces the associated RAG configuration.

During operation, the information handling system may monitor, identify, and/or determine the loading profile using, for example, power sensors, current sensors, voltage sensors, and so forth. Upon identifying the loading profile, the information handling system may then apply the fan configuration that will produce the RAG configuration that best accommodates the loading profile.

At suggested previously, each rotatable airflow guide may be configured to occupy and maintain one of two rotational angles, e.g., open or closed. In its closed rotational angle, the rotatable airflow guide may align with the direction of thermal fan airflow such that the thermal fan airflow is not substantially diverted or redirected by the rotatable airflow guide. Conversely, in an open rotational angle, significant re-direction of airflow may occur. A rotatable airflow guide's open rotational angle may be referred to herein as its open position and the rotatable airflow guide's closed rotational angle may be referred to as its closed position.

The retention structures configured to define a group of distinct rotational angles that the rotatable airflow guide may occupy, may be configured to apply a retention force to the rotatable airflow guide panel where the retention force opposes rotation of the rotatable airflow guide. In such embodiments, the retention structures may be constructed to ensure the retention force is neither too high to permit rotatable airflow guide rotation when desired nor too low to prevent rotatable airflow guide rotation when not desired.

The loading profiles defined for any particular system may include one or more profiles associated with a "normal" or "default" rotatable airflow guide profile, in which rotatable airflow guides are closed, which may correspond to a fan configuration in which all thermal fans operate in a closed position, resulting in little or no pressure differential across any rotatable airflow guide.

In accordance with disclosed thermal management methods and systems, an information handling system includes first processing resources, e.g., GPGPU expansion cards, in a first thermal region of the information handling system and second processing resources, e.g., one or more CPUs, in a second thermal region of the system. The information handling system further includes a computer readable medium comprising processor-executable program instructions that, when executed by a processor, cause the processor to perform particular operations, including determining a loading profile of an information handling system, wherein the loading profile indicates power consumption information for each of a plurality of thermal regions within the system and configuring one or more thermal fans in accordance with a fan configuration associated with the loading profile. The fan configuration defines a fan speed and airflow direction for one or more thermal fans and determines, in accordance with the fan speed and airflow direction of the one or more thermal fans, a rotational angle or position of at least one rotatable airflow guide, wherein the rotational angle of a rotatable airflow guide influences thermal fan airflow provided to one or more of the thermal regions.

The system's rotatable airflow guides may include a first rotatable airflow guide positioned between a first thermal fan aligned with the first thermal region and a second thermal fan, aligned with the second thermal region. In such embodiments a first fan configuration may produce a pressure differential across the first rotatable airflow guide that forces the first rotatable airflow guide to an open rotational angle, increasing airflow to the first thermal region. The first fan configuration may be associated with a first loading profile that indicates power consumption in the first thermal region significantly exceeding power consumption in the second thermal region, e.g., by at least an order of magnitude.

The first fan configuration may indicate the first thermal fan configured to operate at a maximum speed in a negative direction and the second thermal fan configured to operate at the maximum speed in a positive direction. A second fan configuration may produce a second pressure differential across the first rotatable airflow guide. The second pressure differential may force the first rotatable airflow guide to a closed rotational angle or position. In the closed position, the rotatable airflow guide may align or substantially align with a fixed partition oriented in-line with a direction of air flow from the thermal fans, minimizing or reducing diversion of airflow to the first thermal region. The second fan configuration may indicate the first and second thermals fans both configured to operate at a maximum speed in the positive direction.

Each rotatable airflow guide may include a retention element to define a particular rotational angle for the open rotational angle and to prevent rotation of the rotatable airflow guide beyond the open rotational angle. The power consumption information for the first thermal region may include power consumption information for first processing resources located in the first thermal region and power consumption information for second processing resources located in the second thermal region. The first processing resources may include one or more general purpose graphics processing unit expansion cards and the second processing resources may include one or more general purpose central processing units. The information handling system may include a third thermal region including third processing resources. The third thermal region may be adjacent to the second thermal region wherein the second thermal region lies between the first and third thermal regions. The third processing resources, in at least one embodiment, may include one or more general purpose graphics processing unit expansion cards, wherein the first and third thermal regions include similar or substantially similar processing resources. In such embodiments, the at least one rotatable airflow guide may include a first rotatable airflow guide, aligned with a boundary between the first and second thermal regions. The rotatable airflow guide may further include a second rotatable airflow guide, aligned with a boundary between the second and third thermal regions.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3A illustrates a first thermal profile of the information handling system of FIG. 1;

FIG. 3B illustrates a second thermal profile of the information handling system of FIG. 1;

FIG. 3C illustrates a third thermal profile of the information handling system of FIG. 1;

FIG. 3D illustrates a fourth thermal profile of the information handling system of FIG. 1;

FIG. 4B illustrates an additional perspective view of selected elements of the information handling system;

DETAILED DESCRIPTION

In the following detailed description of exemplary embodiments, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for other embodiments.

It is understood that the use of specific component, device, and/or parameter names and/or corresponding acronyms thereof, such as those of the executing utility, logic, and/or firmware (F/W) described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the expansion of the claimed embodiments to embodiments in which different element, feature, protocol, or concept names are utilized. Thus, each term utilized herein is to be given its broadest interpretation given the context in which that term is utilized.

Figure 1:
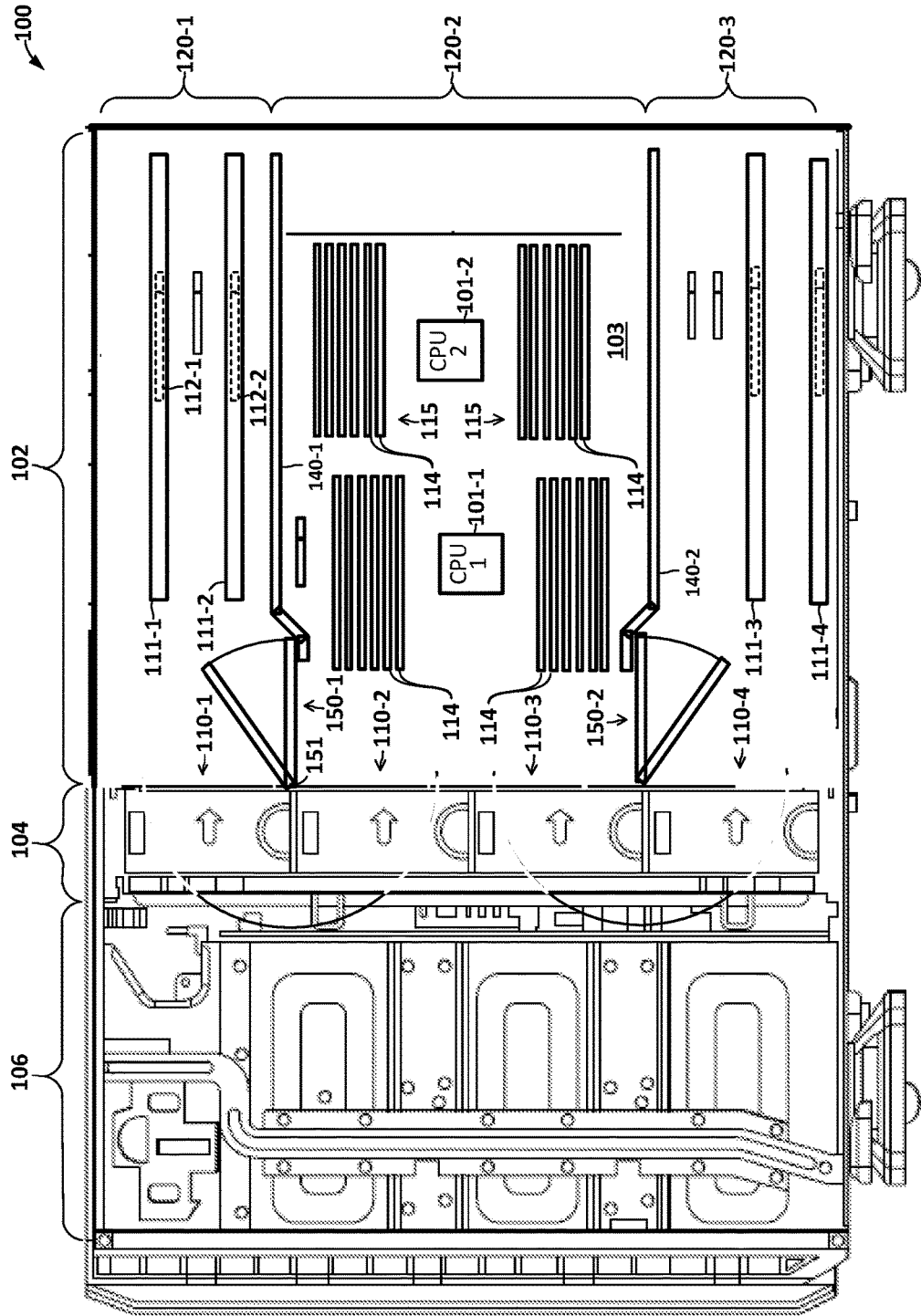
FIG. 1 illustrates a side elevation view of an information handling system including rotatable airflow guides.

Referring to the drawings, FIG. 1 illustrates a side elevation view of an information handling system 100. The illustrated information handling system 100 is representative of information handling systems that may exhibit non-uniform and load-dependent thermal profiles. As illustrated in FIG. 1, information handling system 100 includes one or more rotatable airflow guides 150, further described below, that operate in conjunction with load-dependent thermal fan configurations to achieve load-dependent airflow within information handling system 100.

The information handling system 100 illustrated in FIG. 1 includes forward region 102, mid region 104, and back region 106. The forward region 102 illustrated in FIG. 1 includes processing and memory resources. The processing resources include general purpose central processing units (GPCPUs) 101, also referred to herein simply as central processing units (CPUs) 101 and GPGPU expansion cards 111, also referred to herein simply as graphics processing unit (GPU) expansion cards 111.

More specifically, the information handling system 100 illustrated in FIG. 1 includes first CPU 101-1, second CPU 101-2, and DIMM slots 114 affixed to system board 103 within a second thermal region 120-2 of information handling system 100. Each DIMM slot 114 may receive a corresponding DIMM device, not depicted in FIG. 1 for the sake of clarity. The storage capacity corresponding to the aggregate of all DIMM devices associated with a CPU 101 may be referred to herein as system memory 115. First and second GPU expansion cards 111-1 and 111-2 are illustrated inserted in respective expansion slots 112-1 and 112-2 in a first thermal region 120-1 of information handling system 100. Third and fourth GPU expansion cards 111-3 and 111-4 are illustrated inserted in respective expansion slots 112-3 and 112-4 in a third thermal region 120-3 of information handling system 100. In at least some embodiments, expansion slots 112 may represent peripheral component interconnect express (PCIe) generation 2, 3, or later, expansion slots. Although FIG. 1 illustrates a particular number and arrangement of expansion slots, GPU cards, CPUs, and DIMM slots, other configurations of such elements may benefit from subject matter disclosed herein.

As indicated in the preceding description, forward region 102 encompasses three horizontally oriented thermal regions 120-1 through 120-3, each of which includes one or more processing resources and is capable of generating significant heat. In addition, the thermal regions 120 illustrated in FIG. 1 may exhibit load-dependent behavior wherein the thermal profile resulting from a first operating load may differ or differ substantially from a thermal profile resulting from a second operating load.

In the particular example of FIG. 1, thermal regions 120-1 and 120-3 include GPU expansion cards 111 that generate substantial heat during GPU-intensive operations and program sequences. CPUs 101 and system memory 115 occupy second thermal region 120-2 and may experience periods of heavy loading as well as periods of nominal loading. Thus, information handling system 100 may exhibit four or more loading profiles and each loading profile may be produce a corresponding thermal profile.

Mid region 104 may house one or more thermal fans 110 while back region 106 may include power supplies and additional resources. The information handling system 100 of FIG. 1 includes four thermal fans 110-1, 110-2, 110-3, and 110-4 arranged substantially equi-spaced from bottom to top of the mid region 104. Other information handling systems may be configured with different arrangements of information handling resources, fans, and support resources.

The information handling resources in forward region 102 of information handling system 100 may occupy or define two or more thermal regions 120, each of which may exhibit distinct power consumption and/or heat generation characteristics. The information handling system 100 illustrated in FIG. 1, as an example, includes a first thermal region 120-1, a second thermal region 120-2, and a third thermal region 120-3. Each thermal region 120 may be associated with one or more processing resources within the applicable region. Similarly, each thermal region 120 may correlate roughly with the location or locations of one or more processing resource expansion cards. The processing resources of information handling system 100, as an example, may include one or more GPU expansion cards within first thermal region 120-1, one or more CPUs within second thermal region 120-2, and a one or more GPU expansion cards in third thermal region 120-3.

Information handling system 100 may exhibit a spatial relationship between thermal fans 110 and thermal regions 120 as well as a spatial relationship between thermal fans 110 and information handling system components. For example, first thermal fan 110-1 roughly aligns with first thermal region 120-1 and with first GPU expansion card 111-1 while second thermal fan 110-2 and third thermal fan 110-3 roughly align with the second thermal region 120-2 and the CPUs 101 located within second thermal region 120-2, and fourth thermal fan 110-4 roughly aligns with third thermal region 120-3 and second GPU expansion card 111-2 within third thermal region 120-3.

Alignments between thermal fans 110 and thermal regions 120 and/or alignments between thermal fans 110 and information handling system components such as the GPU expansion cards 111 and the CPUs 101 illustrated in FIG. 1, may be defined, supported, and/or reinforced by one or more structural partitions 140. The information handling system 100 illustrated in FIG. 1 includes a first partition 140-1, positioned roughly between first thermal region 120-1 and second thermal region 120-2, and a second partition 140-2 positioned roughly between second thermal region 120-2 and third thermal region 120-3.

The configuration of information handling system 100 described thus far effectively allocates substantially all responsibility for dissipating heat generated by first GPU expansion card 111-1 in first thermal region 120-1 to first thermal fan 110-1, substantially all responsibility for dissipating heat generated by CPUs 101 in second thermal region 120-2 to the combination of second thermal fan 110-2 and third thermal fan 110-3, and substantially all responsibility for dissipating heat generated by second GPU expansion cards 111-2 in third thermal region 120-3 to fourth thermal fan 111-4.

At least some arrangements of information handling system components and thermal fans may produce scenarios in which it would be more thermally efficient to allocate the thermal dissipation capacity of one or more thermal fans 110 to one or more "unaligned" thermal regions 120, i.e., one or more thermal regions 120 other than the thermal region 120 with which the applicable thermal fan 110 is most closely aligned. For example, first thermal fan 110-1 may be said to be aligned with first thermal region 120-1 and first GPU expansion card 111-1. Conversely, first thermal fan 110-1 may be said to be unaligned with respect to second thermal region 120-2 and CPUs 101, and with respect to third thermal region 120-3 and second GPU expansion card 111-2.

Figure 2A:
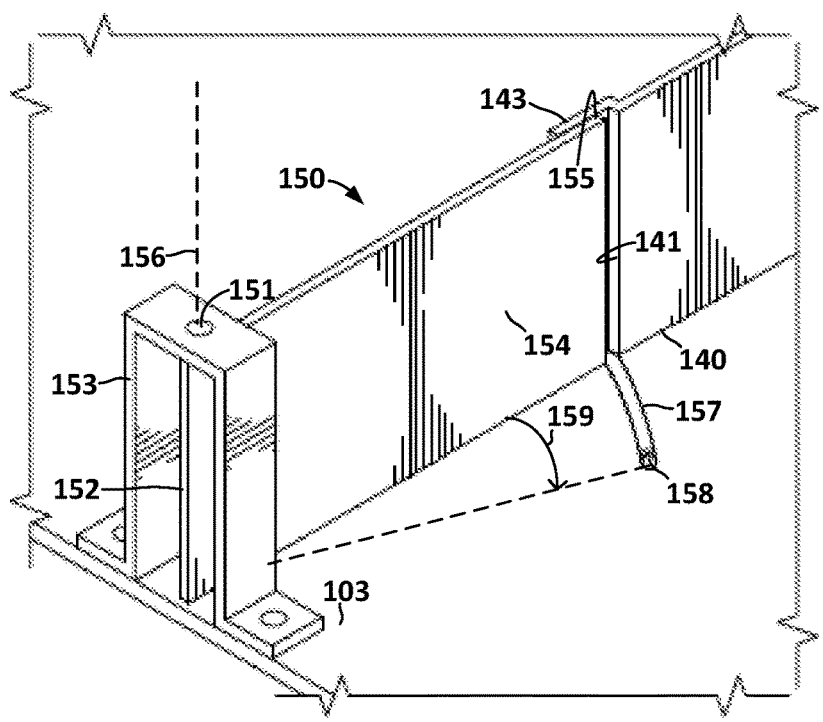
FIG. 2A illustrates a rotatable airflow guide from FIG. 1 in more detail.

The information handling system 100 illustrated in FIG. 1 employs mechanically rotatable airflow guides 150 to divert airflow of one or more thermal fans 110 to one or more unaligned thermal regions 120. Referring to FIG. 2A, an exemplary rotatable airflow guide 150 is illustrated as including a substantially rectangular and planar panel 154. A fixed end 152 of panel 154 receives a hinge pin 151, which is rotatably affixed to a harness 153. Harness 153 is attached to system board 103. A free end 155 of panel 154 extends to a near end 141 of a partition 140. Hinge pin 151 functions as an axis of rotation 156, about which free end 155 of panel 154 may rotate.

Rotatable airflow guide 150 is illustrated in a closed position, with panel 154 substantially co-planar with partition 140. Free end 155 of panel 154 may be constrained in its ability to rotate about hinge pin 151 by one or more structures. In FIG. 2A, for example, a gate stop 143 defines a first constraint on an arc through which free end 155 of panel 154 can travel. A retention structure 157 is affixed to system board 103 along an arc of travel that free end 155 traverses. A terminal end of retention structure 157 includes a wedge 158 that is sufficiently sized and rigid to terminate any further rotation of free end 155. In this manner, retention structure 157 and wedge 158 define a maximum angle of rotation 159 for rotatable airflow guide 150.

Retention structure 157 may have a semispherical cross section, or another suitable configuration, with a dimension and rigidity that are sufficient to apply a characteristic opposing force to free end 155 whenever panel 154 rotates about axis of rotation 156. FIG. 2A illustrates a rotatable airflow guide 150 configured with 2 available rotatable airflow guide positions including a first rotatable airflow guide position defined by gate stop 143 and a second rotatable airflow guide position defined by wedge 158.

Retention structure 157 may be configured to apply a retention force that is sufficient to prevent unintended rotation of a particular rotatable airflow guide 150 when the applicable RAG configuration specifies the rotatable airflow guide as closed, but not so high as to prevent desired rotation of rotatable airflow guide 150 when the RAG configuration specifies the rotatable airflow guide as open.

Figure 2B:
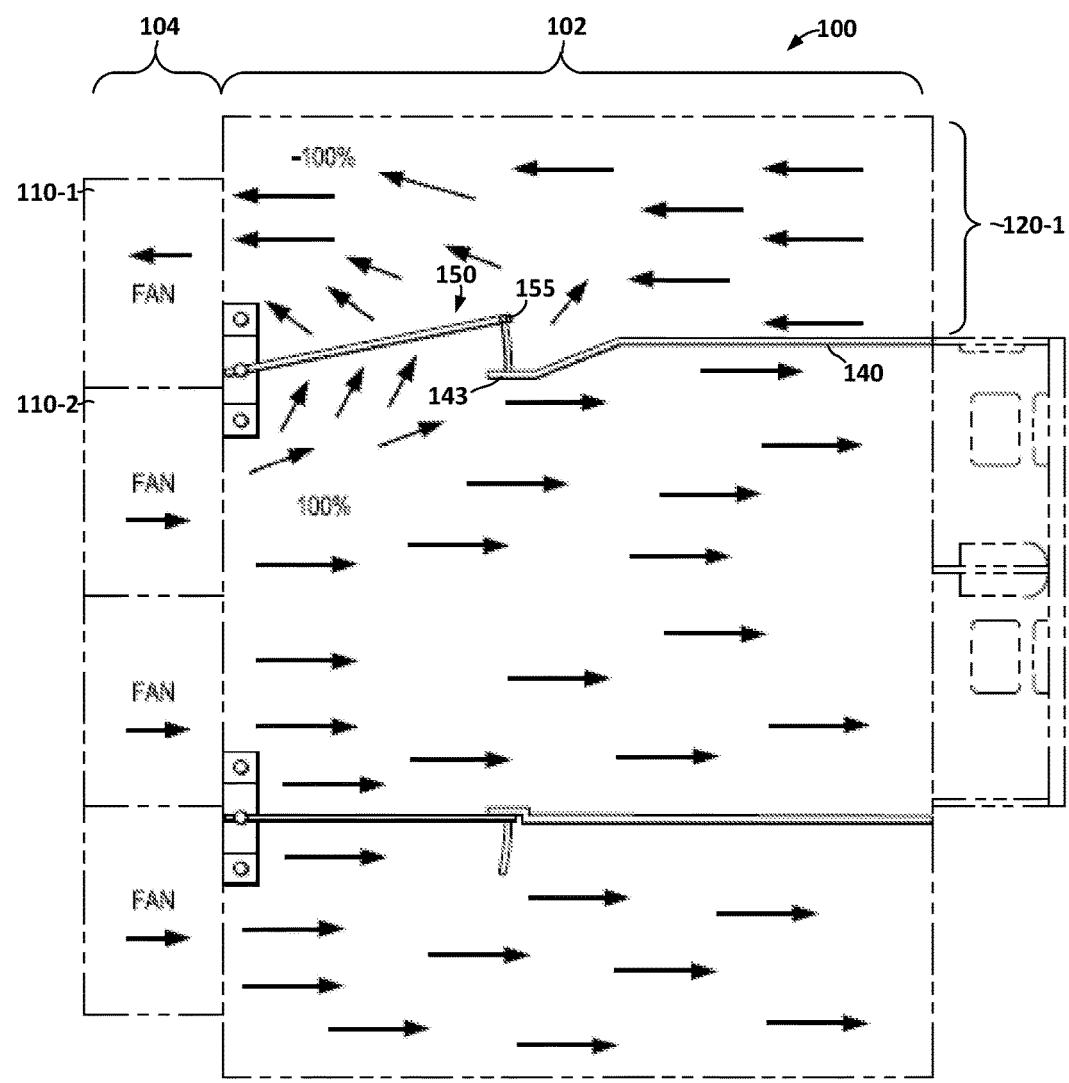
FIG. 2B illustrates a thermal fan configuration producing an opening of a rotatable airflow guide.

With respect to the open position, the maximum rotational force the thermal fans can deliver to the rotatable airflow guide may occur when the applicable fan configuration comprises a thermal fan on one side of a rotatable airflow guide 150 operating at +100%, i.e., maximum RPM in a positive direction, and a thermal fan on an opposite side of the rotatable airflow guide operating at −100%, maximum RPM in a negative direction. This +100%/−100% fan configuration is illustrated in FIG. 2B, wherein first thermal fan 110-1 is operating at −100% T and second thermal fan 110-2 is operating at +100%, producing a rotational force on rotatable airflow guide 150 that causes a free end of rotatable airflow guide 150 to rotate counterclockwise, to its open position. If the thermal fan produces a static pressure of Ps at 100%, the maximum rotational force Fmax is roughly $(2)*(Ps)*(A)$, where A is the area of the panel. If the retention force, Fret, of retention structure 157 is greater than Fmax, the thermal fans will be unable to create sufficient pressure differential to rotate rotatable airflow guide 150 to an open position.

For a closed position of rotatable airflow guide 150, the retention force, Fret, should be sufficient to withstand a worst-case closed position pressure differential. Although the pressure differential for closed position configurations may be close to 0, a more conservative value may be selected to provide some margin. Assuming a worst case pressure differential for a closed configuration is the pressure differential associated with a +100%/0%, fan configuration, i.e., one thermal fan operating at maximum RPM in a forward direction and the other thermal fan operating a 0 RPM, the resulting rotational force is approximately ½

Fmax and the retention structure may be configured to apply a retention force within the range from ½ Fmax to Fmax where Fmax=2*Ps*A.

As illustrated in FIG. 1, the fixed end 152 of each rotatable airflow guide 150 is located in close proximity to the mid region 104 in which the thermal fans 110 are located. In addition, information handling system 100 may be configured to control the speed and direction or polarity of one or more thermal fans 110 to create pressure gradients that control the position of the rotatable airflow guides 150. In at least one embodiment, management resources may be configured to determine or detect one or more loading profiles that warrant rotating or otherwise adjusting one or more rotatable airflow guides 150 and further configured to impose a thermal fan configuration, comprising a fan speed setting for each of the thermal fans 110, to controllably produce pressure gradients across one or more rotatable airflow guides 150.

In at least one embodiment, the desired positions of the rotatable airflow guides 150 are achieved mechanically, by operation of pressure differentials applied to each rotatable airflow guide 150. The pressure differentials are achieved by controlling the speed and direction of the thermal fans 110. A management resource may be configured to detect the thermal profile of information handling system 100, where the thermal profile indicates the combination of thermal generation characteristics of two or more thermal regions 120. The management resource may then identify a thermal fan configuration corresponding to the thermal profile, where the thermal fan configuration indicates the speed and direction of each thermal fan 110. The management resource may determine the fan configuration algorithmically, using a lookup structure, and/or based on a set of one or more rules. The fan configurations may be designed in conjunction with the construction of the rotatable airflow guides to produce pressure differentials result in desirable positioning of the rotatable airflow guides 150.

In at least one embodiment, each of the rotatable airflow guides 150 may be configured to remain in any one of a limited number of stable positions where the number of stable positions may be less than 4 in some embodiments and less than three in some embodiments, and less than another value in still other embodiments. In at least some such embodiments, each rotatable airflow guide 150 may be designed to assume and maintain one of two or possibly three positions with one of the positions being a "neutral" or closed position, in which rotatable airflow guide 150 is substantially aligned with the corresponding partition 140.

To cause the thermal fans to occupy desired positions, the thermal fans may be controlled to create a desired pressure differential in proximity to the applicable rotatable airflow guide 150. The rotatable airflow guides 150 may be constructed with retention members that are configured to retain a rotatable airflow guide in a particular position while the pressure differential is within some particular range. When the fans are in operation such that the pressure differential across a particular rotatable airflow guide 150 exceeds a threshold value, the rotatable airflow guide 150 may be configured to rotate and maintain a different fixed position.

Returning to the FIG. 1 example of an information handling system 100 that includes a pair of GPU expansion cards 111 positioned on either side of a CPU board 132, FIG. 3A through 3B illustrate selected thermal profiles, and the corresponding positions of rotatable airflow guides 150 to divert heat dissipation capacity of one or more thermal fans to one or more unaligned thermal regions.

Referring now to FIG. 3A through 3D, four different loading profiles of information handling system 100 are illustrated together with corresponding thermal fan configurations and RAG configurations of the two rotatable airflow guides 150 included in information handling system 100. FIGS. 3A through 3D thus convey the association of loading profiles with corresponding thermal profiles as well as the additional association between thermal profiles and RAG configurations to modify the airflow characteristics of the information handling system 100 to best accommodate the particular thermal profile.

In each of the loading profiles illustrated in FIG. 3A through 3D, the GPU expansion cards 111 are operating in one of two GPU loading states and the CPUs 101 are operating in one of two CPU loading states. The two GPU loading states illustrated in FIGS. 3A through 3D include heavy GPU loading and idle GPU loading. The two CPU loading states illustrated in FIG. 3A through 3D include heavy CPU loading and nominal CPU loading. These GPU and CPU loading states are exemplary of loading characteristics of high performance computing (HPC) servers and other information handling systems that may employ GPU processing capacity to achieve a performance boost. Specifically, GPU expansion cards 111 consume a tremendous amount of power and produce a corresponding amount of heat when invoked, but consume little power when not in use.

FIG. 3A illustrates a first loading profile 201-1, in which all three thermal regions, 120-1 through 120-3, are experiencing heavy loading. FIG. 3B illustrates a second loading profile characterized by heavy GPU loading in first thermal region 120-1, nominal CPU loading in second thermal region 120-2, and idle GPU loading in third thermal region 120-3. FIG. 3C illustrates a third loading profile characterized by idle GPU loading in first thermal region 120-1, nominal CPU loading in second thermal region 120-2, and heavy GPU loading in third thermal region 120-3. Finally, FIG. 3D illustrates a fourth loading profile characterized by heavy GPU loading in first thermal region 120-1 and third thermal region 120-3 and nominal CPU loading in second thermal region 120-2.

FIGS. 3A through 3D illustrate exemplary RAG configurations for the corresponding loading profiles. Each RAG configuration indicates or includes a rotatable airflow guide position for each rotatable airflow guide employed.

Each RAG configuration is intended to divert or otherwise increase airflow to heavily loaded thermal regions when doing so does not have a significant negative impact on the remaining thermal regions.

Each RAG configuration is associated with a corresponding thermal fan configuration that indicates a speed and direction for each thermal fan 110 that will produce the desired rotatable airflow guide state. FIGS. 3A through 3D illustrate "2-state" embodiments in which each rotatable airflow guide 150 has two possible positions, open or closed, as determined by the pressure differential created across the applicable rotatable airflow guide by the corresponding thermal fan configuration. In at least one such embodiment, the closed position refers to a position in which a rotatable airflow guide 150 is substantially aligned with its corresponding fixed partition 140 and the open position-refers to a position in which the rotatable airflow guide 150 has rotated, about a rotatable airflow guide axis located at one end of the rotatable airflow guide, through a particular angle where the particular angle may be in the range of approximately 20 to 70 degrees in at least some embodiments.

Although the figures illustrate a 2-state embodiment, other embodiments may employ three or more states of rotatable airflow guides 150.

FIG. 3A illustrates a maximum loading profile characterized by GPU expansion cards 111 in thermal regions 120-1 and 120-3 exhibiting heavy GPU loading and CPUs 101 and system memory 115 in second thermal region 120-2 exhibiting heavy CPU loading. Although the actual power consumption will vary from implementation to implementation, exemplary power consumption values are included herein for purposes of illustration. In at least one embodiment typical of an HPC-class tower server, a GPU expansion card power consumption of approximately 600 W may be typical for heavy GPU loading and CPU/memory power consumption of approximately 410 W may be typical for heavy CPU loading, including approximately 290 W of CPU power consumption and approximately 120 W of system memory power consumption. In such an embodiment, the maximum loading profile may be characterized by approximately 600 W of power consumption in thermal regions 120-1 and 120-3 and approximately 410 W of power consumption in thermal region 120-2.

FIG. 3A further illustrates a maximum loading RAG configuration in which both rotatable airflow guides 150 are in their closed positions. A thermal fan configuration suitable for achieving the maximum loading RAG configuration includes all four thermal fans 110 operating at +100%, i.e., operating at full speed in the forward direction wherein the forward direction refers to the direction from left to right as illustrated in FIG. 3A.

FIG. 3B illustrates a top-heavy thermal profile characterized by GPU expansion cards 111 in first thermal region 120-1 exhibiting heavy GPU loading, GPU expansion cards 111 in third thermal region 120-3 exhibiting idle GPU loading, and CPUs 101 and system memory 115 in second thermal region 120-2 exhibiting nominal CPU loading. In at least one embodiment, a GPU expansion card power consumption of less than approximately 100 W may be typical for idle GPU loading and CPU/memory power consumption of approximately 160 W may be typical for nominal CPU loading, including approximately 40 W of CPU power consumption and approximately 120 W of system memory power consumption. In such an embodiment, the top-heavy loading profile may be characterized by approximately 600 W of power consumption in first thermal region 120-1, less than approximately 100 W of power consumption in third thermal region 120-3, and approximately 160 W of power consumption in second thermal region 120-2.

FIG. 3B further illustrates a top-heavy RAG configuration suitable for the top-heavy loading profile. The top-heavy RAG configuration illustrated in FIG. 3B includes first rotatable airflow guide 150-1 in its open position and second rotatable airflow guide 150-2 in its closed position. A top-heavy thermal fan configuration suitable for achieving the top-heavy RAG configuration is illustrated in FIG. 3B, with first thermal fan 110-1 operating a −100%, i.e., full speed, reverse direction, and second and third thermal fans 110-2, 110-3, and 110-4 all operating at +100%.

FIG. 3C illustrates a bottom-heavy thermal profile characterized by GPU expansion cards 111 in third thermal region 120-3 exhibiting heavy GPU loading, GPU expansion cards 111 in first thermal region 120-1 exhibiting idle GPU loading, and CPUs 101 and system memory in second thermal region 120-2 exhibiting nominal CPU loading. Thus, the bottom-heavy loading profile may be characterized by approximately 600 W of power consumption in third thermal region 120-3, less than approximately 100 W of power consumption in first thermal region 120-1, and approximately 160 W of power consumption in second thermal region 120-2.

FIG. 3C further illustrates a bottom-heavy RAG configuration suitable for the bottom-heavy loading profile. The bottom-heavy RAG configuration illustrated in FIG. 3C includes first rotatable airflow guide 150-1 in its closed position and second rotatable airflow guide 150-2 in its open position. A bottom-heavy thermal fan configuration suitable for achieving the bottom-heavy RAG configuration is illustrated in FIG. 3C, with fourth thermal fan 110-4 operating at −100% and first, second, and third thermal fans 110-1, 110-2, and 110-3 all operating at +100%.

FIG. 3D illustrates a GPU-heavy thermal profile characterized by GPU expansion cards 111 in first and third thermal regions 120-1 and 120-3 exhibiting heavy GPU loading and CPUs 101 and system memory 115 in second thermal region 120-2 exhibiting nominal CPU loading. Accordingly, the GPU-heavy loading profile may be characterized by approximately 600 W of power consumption in first and third thermal regions 120-1 and 120-3 and approximately 160 W of power consumption in second thermal region 120-2.

FIG. 3D further illustrates a GPU-heavy RAG configuration suitable for the GPU-heavy loading profile. The GPU-heavy RAG configuration illustrated in FIG. 3D includes first rotatable airflow guide 150-1 in its open position and second rotatable airflow guide 150-2 in its open position. A GPU-heavy thermal fan configuration suitable for achieving the GPU-heavy RAG configuration is illustrated in FIG. 3D, with first and fourth thermal fans 110-1 and 110-4 operating at −100% and second and third thermal fans 110-2 and 110-3 operating at +100%.

Figure 4A:
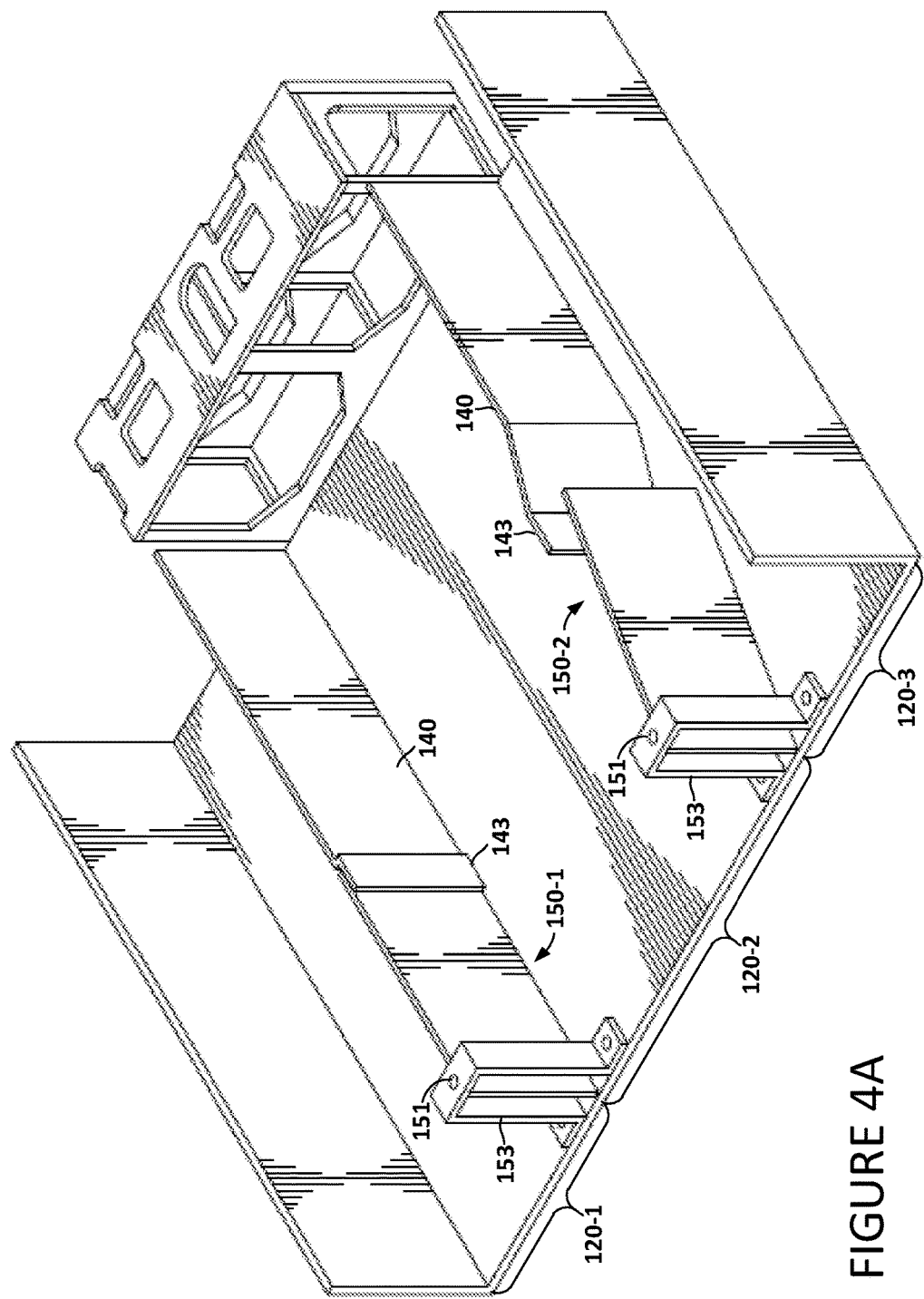
FIG. 4A illustrates a perspective view of selected elements of the information handling system.
Figure 4C:
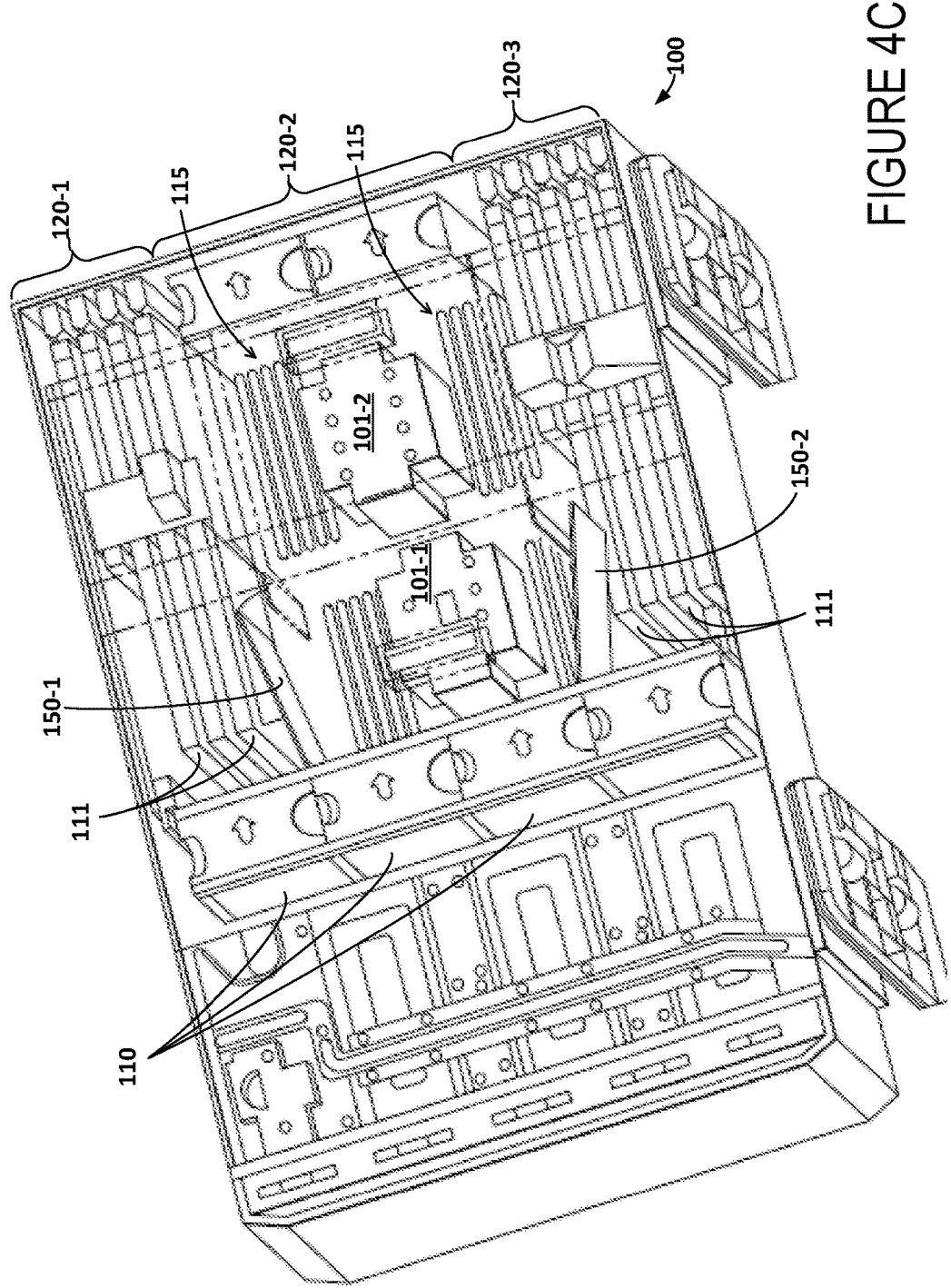
FIG. 4C illustrates a third perspective view of the information handling system.

FIG. 4A and FIG. 4B illustrate perspective views of selected isolated structural elements, including the rotatable airflow guides 150, of information handling system 100. FIG. 4C illustrates a perspective view of rotatable airflow guides 150 as implemented within information handling system 100.

Figure 5:
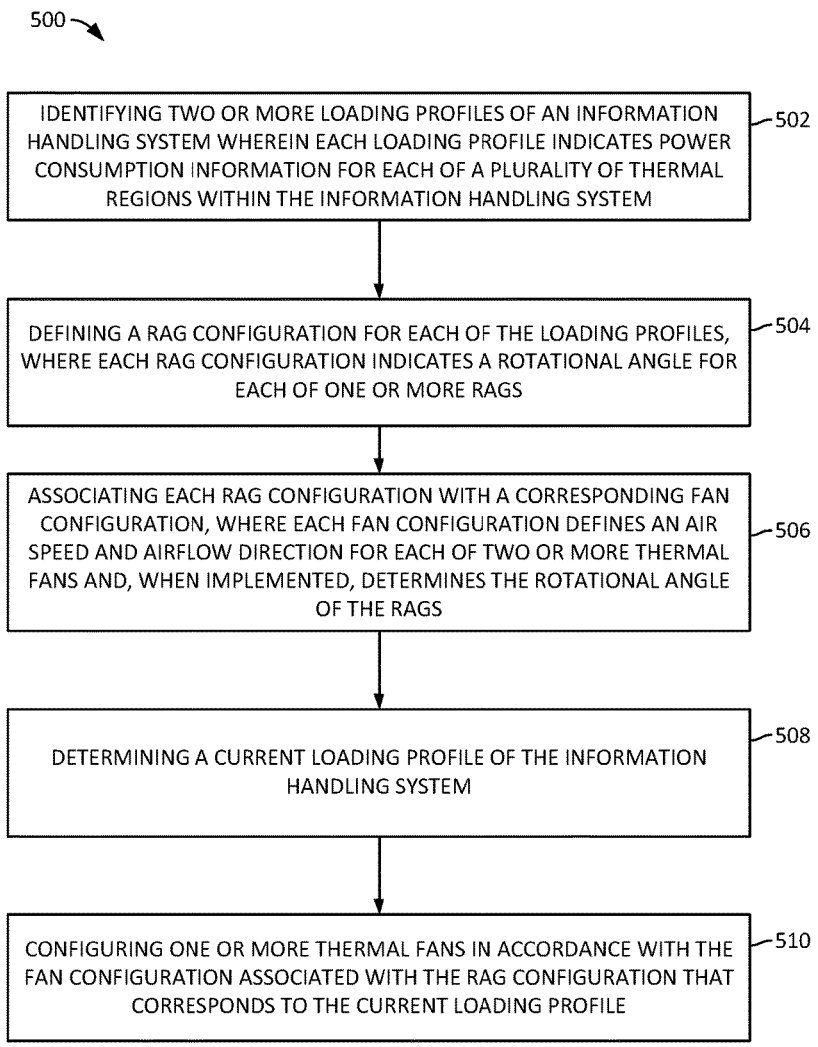
FIG. 5 illustrates a flow diagram of a method for managing heat dissipation in an information handling system.

Turning now to FIG. 5, a flow diagram illustrates a method 500 of managing heat dissipation resources in an information handling system. The method 500 illustrated in FIG. 5 includes identifying (Operation 502) two or more loading profiles of an information handling system. Each loading profile may indicate power consumption information for each of a plurality of thermal regions within the information handling system. A RAG configuration may be defined (Operation 504) for each of the loading profiles. Each RAG configuration may indicate a rotational angle for each of one or more rotatable airflow guides. Each RAG configuration may then be associated with a corresponding fan configuration. Each fan configuration may define an air speed and airflow direction for each of two or more thermal fans in the information handling system. Each fan configuration, when implemented, forces the rotational airflow guides to the defined rotational angles. The present loading profile of the information handling system may then be determined (Operation 508). The thermal fans may then be configured (Operation 510) in accordance with the fan configuration associated with the RAG configuration corresponding to the present loading profile, thereby causing the rotational airflow guides to assume the rotational angles most appropriate for the loading profile.

Any one or more processes or methods described above, including processes and methods associated with the FIG. 5 flow diagrams, may be embodied as a computer readable storage medium or, more simply, a computer readable medium including processor-executable program instructions, also referred to as program code or software, that, when executed by the processor, cause the processor to perform or otherwise results in the performance of the applicable operations.

A computer readable medium, which may also be referred to as computer readable memory or computer readable storage, encompasses volatile and non-volatile medium, memory, and storage, whether programmable or not, whether randomly accessible or not, and whether implemented in a semiconductor, ferro-magnetic, optical, organic, or other suitable medium. Information handling systems may include two or more different types of computer readable medium and, in such systems, program code may be stored, in whole or in part, in two or more different types of computer readable medium.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, F/W, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicates the presence of stated features, operations, elements, and/or components, but does not preclude the presence or addition of one or more other features, operations, elements, components, and/or groups thereof.

What is claimed is:

1. An information handling system, comprising:
   first processing resources in a first thermal region of the information handling system;
   second processing resources in a second thermal region of the information handling system; and
   a non-transitory computer readable medium, including processor-executable program instructions that, when executed by a processor, cause the processor to perform operations comprising:
      determining a loading profile of an information handling system, wherein the loading profile indicates power consumption information for each of a plurality of thermal regions of the information handling system;
      configuring one or more thermal fans in accordance with a fan configuration associated with the loading profile, wherein the fan configuration:
      defines a fan speed and airflow direction for one or more thermal fans; and
      determines, in accordance with the fan speed and airflow direction of the one or more thermal fans, a rotational state of each of one or more rotatable airflow guides, wherein the rotational state influences thermal fan airflow provided to one or more of the thermal regions;
   wherein each of the one or more rotatable airflow guides includes a first rotatable airflow guide positioned between a first thermal fan aligned with the first thermal region and a second thermal fan, aligned with the second thermal region and wherein a first fan configuration produces a pressure differential across the first rotatable airflow guide that forces the first rotatable airflow guide to an open rotational angle, increasing airflow to the first thermal region;
   wherein the first fan configuration is associated with a first loading profile indicating power consumption in the first thermal region exceeding power consumption in the second thermal region; and
   wherein the first fan configuration includes:
      the first thermal fan configured to operate in a negative direction, pulling air from the first thermal region towards the first thermal fan; and
      the second thermal fan configured to operate in a positive direction, pushing air from the second thermal fan towards the second thermal region.

2. The information handling system of claim 1, wherein the first loading profile is indicative of power consumption in the first thermal region exceeding power consumption in the second thermal region by at least an order of magnitude.

3. The information handling system of claim 2, wherein the first fan configuration includes:
   the first thermal fan configured to operate at its maximum speed in the negative direction; and
   the second thermal fan configured to operate at its maximum speed in the positive direction.

4. The information handling system of claim 1, wherein a second fan configuration produces a second pressure differential across the first rotatable airflow guide, wherein the second pressure differential forces the first rotatable airflow guide to a closed rotational angle, decreasing diversion of airflow to the first thermal region.

5. The information handling system of claim 4, wherein the second fan configuration includes:
   the first and second thermals fans both configured to operate at a maximum speed in the positive direction.

6. The information handling system of claim 4, wherein each of the one or more rotatable airflow guides includes a retention element to define a particular rotational angle for the open rotational angle and to prevent rotation of the rotatable airflow guide beyond the open rotational angle.

7. The information handling system of claim 1, wherein the power consumption information for the first thermal region comprises power consumption information for first processing resources located in the first thermal region and wherein the power consumption information for the second thermal region comprises power consumption information for second processing resources located in the second thermal region.

8. The information handling system of claim 7, wherein the first processing resources include one or more general purpose graphics processing unit expansion cards and wherein the second processing resources include one or more general purpose central processing units.

9. The information handling system of claim 7, wherein:
the information handling system includes a third thermal region comprising third processing resource;
the second thermal region is located between the first and third thermal regions;
the third processing resources include one or more general purpose graphics processing unit expansion cards and wherein; and
the one or more rotatable airflow guides include:
a second rotatable airflow guide, aligned with a boundary between the second and third thermal regions.

10. A thermal management method, comprising:
determining a loading profile of an information handling system, wherein the loading profile indicates power consumption information for each of a plurality of thermal regions of the information handling system;
configuring one or more thermal fans in accordance with a fan configuration associated with the loading profile, wherein the fan configuration:
defines a fan speed and airflow direction for one or more thermal fans; and
determines, in accordance with the fan speed and airflow direction of the one or more thermal fans, a rotational state for each of one or more rotatable airflow guides, wherein the rotational state influences thermal fan airflow provided to one or more of the thermal regions;
wherein each of the one or more rotatable airflow guides includes a first rotatable airflow guide positioned between a first thermal fan aligned with a first thermal region and a second thermal fan, aligned with a second thermal region and wherein a first fan configuration produces a pressure differential across the first rotatable airflow guide that forces the first rotatable airflow guide to an open rotational angle, increasing airflow to the first thermal region;
wherein the first fan configuration is associated with a first loading profile indicating power consumption in the first thermal region exceeding power consumption in the second thermal region; and
wherein the first fan configuration includes:
the first thermal fan configured to operate in a negative direction, pulling air from the first thermal region towards the first thermal fan; and
the second thermal fan configured to operate in a positive direction, pushing air from the second thermal fan towards the second thermal region.

11. The method of claim 10, wherein the first loading profile is indicative of power consumption in the first thermal region exceeding power consumption in the second thermal region by at least an order of magnitude.

12. The method of claim 11, wherein the first fan configuration includes:
the first thermal fan configured to operate at its maximum speed in the negative direction; and
the second thermal fan configured to operate at its maximum speed in the positive direction.

13. The method of claim 10, wherein a second fan configuration produces a second pressure differential across the first rotatable airflow guide, wherein the second pressure differential forces the first rotatable airflow guide to a closed rotational angle, decreasing diversion of airflow to the first thermal region.

14. The method of claim 13, wherein the second fan configuration includes:
the first and second thermals fans both configured to operate at a maximum speed in the positive direction.

15. The method of claim 13, wherein each of the one or more rotatable airflow guides includes a retention element to define a particular rotational angle for the open rotational angle and to prevent rotation of the rotatable airflow guide beyond the open rotational angle.

16. The method of claim 10, wherein the power consumption information for the first thermal region comprises power consumption information for first processing resources located in the first thermal region and wherein the power consumption information for the second thermal region comprises power consumption information for second processing resources located in the second thermal region.

17. The method of claim 16, wherein the first processing resources include one or more general purpose graphics processing unit expansion cards and wherein the second processing resources include one or more general purpose central processing units.

18. The method of claim 16, wherein:
the information handling system includes a third thermal region comprising third processing resources;
the second thermal region is located between the first and third thermal regions;
the third processing resources include one or more general purpose graphics processing unit expansion cards and wherein; and
the one or more rotatable airflow guides include:
a second rotatable airflow guide, aligned with a boundary between the second and third thermal regions.

* * * * *